United States Patent
Stopa et al.

(10) Patent No.: US 10,420,177 B2
(45) Date of Patent: Sep. 17, 2019

(54) LED ILLUMINATION MODULE WITH FIXED OPTIC AND VARIABLE EMISSION PATTERN

(71) Applicant: Whelen Engineering Company, Inc., Chester, CT (US)

(72) Inventors: James L. Stopa, East Hampton, CT (US); Todd J. Smith, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 0 days.

(21) Appl. No.: 15/847,387

(22) Filed: Dec. 19, 2017

(65) Prior Publication Data
US 2018/0192484 A1    Jul. 5, 2018

Related U.S. Application Data

(63) Continuation-in-part of application No. 15/383,469, filed on Dec. 19, 2016.
(Continued)

(51) Int. Cl.
*H05B 33/08* (2006.01)
*G02B 27/09* (2006.01)
(Continued)

(52) U.S. Cl.
CPC ........... *H05B 33/0803* (2013.01); *F21V 5/04* (2013.01); *F21V 5/045* (2013.01); *F21V 7/0091* (2013.01);
(Continued)

(58) Field of Classification Search
CPC . F21V 7/0091; F21V 7/0016; H05B 33/0845; H05B 33/0854; F21S 10/066; F21S 10/063; F21S 10/023
See application file for complete search history.

(56) References Cited

U.S. PATENT DOCUMENTS

| 4,755,916 A | 7/1988 | Collins |
| 6,547,249 B2 | 4/2003 | Collins, III et al. |

(Continued)

FOREIGN PATENT DOCUMENTS

| DE | 102012201494 A1 | 8/2012 |
| WO | 2009031128 A1 | 3/2009 |

(Continued)

OTHER PUBLICATIONS

International Search Report and Written Opinion dated Mar. 20, 2018 (PCT/US2017/067364).

(Continued)

*Primary Examiner* — William N Harris
(74) *Attorney, Agent, or Firm* — Alix, Yale & Ristas, LLP

(57) ABSTRACT

An LED illumination module including an LED lamp with a plurality of light emitting dies on a substrate in combination with an optic having a single focus. The light emitting dies include a single center light emitting die centered on an optical axis and peripheral dies arranged around the center die. The illumination module includes a beam forming optic having a single focus arranged over the LED lamp with the focus on the optical axis of the center die. Light emitted from the center die is substantially collimated by the optic in a focused "spot" emission pattern. Light emitted from the peripheral dies results in a more dispersed or divergent "flood" emission pattern. The center die and peripheral dies are independently controlled and the power delivered to the dies can be varied independently to generate different light emission patterns using the same optic.

17 Claims, 12 Drawing Sheets

Related U.S. Application Data

(60) Provisional application No. 62/547,454, filed on Aug. 18, 2017.

(51) Int. Cl.

| | | |
|---|---|---|
| *G02B 27/40* | (2006.01) | |
| *G02B 19/00* | (2006.01) | |
| *F21V 5/04* | (2006.01) | |
| *F21V 7/00* | (2006.01) | |
| *F21Y 115/10* | (2016.01) | |
| *F21Y 105/16* | (2016.01) | |
| *F21Y 103/10* | (2016.01) | |
| *F21Y 113/17* | (2016.01) | |
| *F21V 13/04* | (2006.01) | |
| *G02B 3/08* | (2006.01) | |
| *F21L 4/00* | (2006.01) | |
| *F21W 111/00* | (2006.01) | |

(52) U.S. Cl.
CPC .......... *F21V 13/04* (2013.01); *G02B 19/0014* (2013.01); *G02B 19/0066* (2013.01); *G02B 27/0955* (2013.01); *G02B 27/0977* (2013.01); *G02B 27/40* (2013.01); *H05B 33/0845* (2013.01); *F21L 4/005* (2013.01); *F21V 13/045* (2013.01); *F21W 2111/00* (2013.01); *F21Y 2103/10* (2016.08); *F21Y 2105/16* (2016.08); *F21Y 2113/17* (2016.08); *F21Y 2115/10* (2016.08); *G02B 3/08* (2013.01); *G02B 19/0028* (2013.01)

(56) References Cited

U.S. PATENT DOCUMENTS

| | | | |
|---|---|---|---|
| 6,866,401 B2 | 3/2005 | Sommers et al. | |
| 6,986,593 B2 | 1/2006 | Rhoads et al. | |
| 7,083,304 B2 | 8/2006 | Rhoads et al. | |
| 7,114,832 B2 | 10/2006 | Holder et al. | |
| 7,172,319 B2 | 2/2007 | Holder et al. | |
| 7,461,948 B2 | 12/2008 | van Voorst Vader et al. | |
| 7,543,941 B2 | 6/2009 | Holder et al. | |
| 7,652,274 B2 | 1/2010 | Wernersson | |
| 7,674,018 B2 | 3/2010 | Holder et al. | |
| 7,806,558 B2 * | 10/2010 | Williamson | F21V 7/0091 362/237 |
| 7,850,334 B2 | 12/2010 | Holder et al. | |
| 8,680,753 B2 | 3/2014 | Oechsle et al. | |
| 8,729,571 B2 | 5/2014 | Daschner et al. | |
| 8,796,930 B2 | 8/2014 | Adams et al. | |
| 8,840,274 B1 | 9/2014 | Adams et al. | |
| 8,947,527 B1 | 2/2015 | Postovalov et al. | |
| 8,979,303 B2 | 3/2015 | Adams | |
| 9,109,781 B2 | 8/2015 | Holder | |
| 9,341,934 B2 | 5/2016 | De Sisti et al. | |
| 2009/0296407 A1 * | 12/2009 | Bailey | F21V 5/04 362/309 |
| 2010/0295481 A1 * | 11/2010 | Van Endert | H03K 17/96 315/312 |
| 2011/0182065 A1 * | 7/2011 | Negley | F21V 5/04 362/231 |
| 2012/0138977 A1 | 6/2012 | Li | |
| 2012/0189291 A1 | 7/2012 | von Malm et al. | |
| 2013/0088142 A1 * | 4/2013 | Allen | F21K 9/62 313/498 |
| 2013/0170220 A1 * | 7/2013 | Bueeler | F21K 9/00 362/296.01 |
| 2013/0214696 A1 | 8/2013 | Huang et al. | |
| 2014/0084809 A1 * | 3/2014 | Catalano | H05B 33/0845 315/292 |
| 2015/0228876 A1 | 8/2015 | Place et al. | |
| 2016/0116723 A1 * | 4/2016 | Hukkanen | G02B 3/08 362/329 |
| 2016/0169458 A1 | 6/2016 | Catalano | |
| 2017/0114980 A1 | 4/2017 | Madril | |
| 2017/0184944 A1 | 6/2017 | Butterworth | |

FOREIGN PATENT DOCUMENTS

| | | |
|---|---|---|
| WO | 2009059461 A1 | 5/2009 |
| WO | 2011144597 A2 | 11/2011 |
| WO | 2014047621 A1 | 3/2014 |

OTHER PUBLICATIONS

Setlur, Anant A., "Phosphors for LED-based Solid-State Lighting," The Electrochemical Society, Interface, Winter 2009.

\* cited by examiner

| | 114 | 116a | 116b | 116C |
|---|---|---|---|---|
| STEP | CENTER | INNER | MIDDLE | OUTER |
| 1 | 100.0% | 00.0% | 00.0% | 00.0% |
| 2 | 90.4% | 0.43% | 0.87% | 1.50% |
| 3 | 81.8% | 0.59% | 1.2% | 2.0% |
| 4 | 73.9% | 0.79% | 1.6% | 2.7% |
| 5 | 66.8% | 1.07% | 2.1% | 3.7% |
| 6 | 60.4% | 1.4% | 2.9% | 5.0% |
| 7 | 54.6% | 1.9% | 3.9% | 6.7% |
| 8 | 49.4% | 2.6% | 5.3% | 9.1% |
| 9 | 44.7% | 3.5% | 7.1% | 12.2% |
| 10 | 40.4% | 4.8% | 9.6% | 16.5% |
| 11 | 36.5% | 6.5% | 12.9% | 22.3% |
| 12 | 33.0% | 8.7% | 17.5% | 30.1% |
| 13 | 29.8% | 11.8% | 23.6% | 40.6% |
| 14 | 27.0% | 15.9% | 31.8% | 54.9% |
| 15 | 24.4% | 21.5% | 43.0% | 74.1% |
| 16 | 22.1% | 29.0% | 58.0% | 100.0% |
| 17 | 19.9% | 39.2% | 78.3% | 100.0% |

FIG. 14

LED ILLUMINATION MODULE WITH FIXED OPTIC AND VARIABLE EMISSION PATTERN

BACKGROUND

Light emitting diodes (LEDs) are now the standard light source for a wide variety of illumination, warning, and signaling devices. LEDs include a semiconductor die (or die) which emits light of a pre-determined wavelength (color) when energized by electrical power. The light emitting die is typically placed on a thermally conductive support, provided with electrically conductive contacts to connect the die to an electrical circuit and may include a primary optic. An assembly of a light emitting die, thermally conductive support, electrical connections and primary optic (if present) may be referred to as an LED lamp. LED lamps in a variety of colors and light generating capacities are generally available. In some cases, several light emitting dies are placed on a common thermally conductive support. The light emitting dies may be of the same color or different colors. Some LED lamps provide primary color mixing necessary for color displays, with light emitting dies for each of the colors on a common support.

Light is radiated from the die of an LED away from the thermally conductive support emitting in a divergent pattern surrounding an optical axis passing through a center of the light emitting die. Light emission from the die of an LED may also be described as being emitted away from a plane passing through the die, the optical axis being perpendicular to the plane. An LED lamp may include a primary optic that modifies the pattern of light emitted from the die or dies, but all LED lamps are "directional" light sources in that light is emitted in a direction away from the thermally conductive support. Lighting devices that employ LED lamps are designed produce different light emission patterns suited to the purpose of the lighting device. The configuration of the light-shaping components (lenses and/or reflectors) is determined in part by the light emission pattern of the lamp, and in part by the desired emission pattern of the lighting device. Common lighting device light emission patterns include a collimated beam (spot), and evenly distributed (flood) patterns. Partially collimated beams and shaped light emission patterns are also employed for particular purposes. Lighting devices include optical assemblies of lenses and/or reflectors to modify the light emission pattern of one or more LED lamps to produce the desired light emission pattern. The optical assemblies are commonly constructed around a focal point and/or focal axis, and light emitted from the focal point or focal axis is handled accurately by the optical assembly. Light emitted at positions offset from the focal point or axis of the assembly is emitted from the assembly in an emission pattern that is different from the designed emission pattern. The ability of optical assemblies to generate a precise emission pattern from an LED is somewhat compromised by the fact that each light emitting die has an area, and light emitted from areas of the die spaced from the center of the die is offset from the optical focus or focal axis of the optical assembly. Large light emitting dies and large substrates with multiple dies may exaggerate this effect, which generally results in a blurred emission pattern.

Some lighting devices are configured to generate more than one light emission pattern. For example, a flashlight may be designed to emit both a focused beam (spot) and a diffuse (flood) light emission patterns. This is typically accomplished by moving the optical assembly relative to a single light source, which alters the pattern of light emitted.

Other lighting devices may include multiple light sources, each with its own dedicated optical assembly and operate different light sources to generate specific patterns of light emission. Multiple optical assemblies can be costly to manufacture and may not be possible within the constraints applicable to a specific lighting device configuration.

There is a need in the art for lighting devices that can generate different light emission patterns utilizing the same stationary optical assembly with a single focus.

There is a need in the art for a solid state lighting device capable of producing a variable divergence light emission pattern with no moving parts.

SUMMARY OF THE INVENTION

One embodiment of an LED illumination module according to the disclosure includes an LED lamp with a plurality of light emitting dies on a substrate in combination with an optical assembly configured to reduce the divergence of light radiated from one of the dies. The light emitting dies may include a single center light emitting die or a central group of light emitting dies centered on an optical axis. The optical axis may be coincident with an axis of an optical assembly. The light emitting dies on the substrate also include one or more peripheral dies arranged around the center die or group of dies. The peripheral dies may be arranged symmetrically or asymmetrically around the center die or group of dies. The disclosed illumination module may include a beam forming optic having a single focus. The optic is supported in a fixed position over the LED lamp. The focus of the optic may be on the optical axis of the center die or central group of dies and the focus may be in a plane with the central die or group of dies. Light emitted from the central die, or group of dies may be substantially collimated by the optic and is emitted in a focused "spot" emission pattern. Other emission patterns may be selected, with the optical assembly configured to reduce the divergence of light emitted from the LED lamp into emission patterns from a wide angle "flood" to the focused "spot" and beams of varying divergence between spot and flood. Light emitted from the one or more peripheral dies is emitted from areas spaced apart from the focus of the optic and is emitted as a more dispersed and divergent "flood" emission pattern. The center die or group of dies and one or more peripheral dies are independently controlled, so a spot or flood emission pattern can be generated from the same optic by switching between the center die(s) and peripheral die(s). Alternatively, the power delivered to the center die(s) and peripheral die(s) can be varied independently to generate light emission patterns from a spot (only center die(s) on) to a spot/flood (all die(s) on) to a flood (only peripheral die(s) on), with no moving parts and using the same optic which may have a single focus.

The peripheral die may be a single epitaxial die surrounding the center die in a symmetrical or asymmetrical configuration. Alternatively, the disclosed LED illumination module may be constructed using a plurality of dies forming a group at the center of the substrate and a plurality of dies arranged around the center group. Subsets of the peripheral dies may be configured to receive energy together, or all the peripheral dies may receive energy at the same time. Light from peripheral dies is emitted from the optical assembly with a trajectory toward the diametrically opposite side of the light emission pattern, so energizing peripheral dies or groups of peripheral dies in sequence can generate a moving light emission pattern centered on the axis of a symmetrical optical assembly. Colored light emission from a row of LED illumination modules can be balanced by placing one die of each color at the focus of the optic and ensuring equal numbers of that color die in each of the peripheral positions.

One embodiment of a disclosed LED lamp includes a center die surrounded by a plurality of rings of peripheral dies with the rings being concentric with an optical axis of the emitter passing through the center of the center die. The peripheral dies in each ring may be connected to be energized as a group. When this embodiment of an LED lamp is positioned behind a beam-forming optical assembly, energizing each ring of peripheral dies adds light in a pattern that surrounds a beam formed by the center die. As the rings progress away from the optical axis, light from each ring contributes light to the emission pattern radially outward of light from the center die and radially inwardly adjacent rings. The emission pattern can be adjusted from a spot beam to a flood pattern by varying the power applied to the center die and rings of LED dies.

The term "ring" as used in this application includes formations of dies positioned around the center die to which power can be applied independently of the center die and the other peripheral "rings" of dies. Each ring may be annular or circular and concentric with the optical axis of the assembly. A ring may also be non-circular, such as a square arrangement of dies. Each ring may be composed of an arrangement of dies arranged in a uniform pattern that is symmetrical about the center axis. Rings of dies according to the disclosure may also include arrangements of dies that are non-uniform, and may be asymmetrical relative to the focal axis of the assembly. For example, dies may be clustered at some locations of the ring, with reduced numbers of dies at other locations. Although circular beam-forming optics are disclosed, other shapes of beam forming optic are compatible with the disclosed illumination module. In the case of a non-circular beam-forming optic, the rings of peripheral dies may be configured to provide relatively uniform light intensity on the reflecting and refracting surfaces of the beam-forming optic, which may result in a pattern of die placement that is non-uniform relative to the optical axis of the assembly.

The disclosed LED illumination modules may be used wherever illuminators with different beam emission patterns are needed. Applications include interior and exterior automotive lighting, emergency lighting, spotlights for automotive and marine use, interior and exterior architectural lighting, work lights, interior and exterior aviation lighting, motorcycle and bicycle lighting, camera lighting, stage/theatrical lighting, flashlights, search lights, weapon targeting illuminators, remotely operated search lights, and robot-mounted illuminators for search and rescue, inspection or the like, including drone mounted lighting. The disclosed LED illumination modules provide variable light emission patterns from a single optical structure with no moving parts.

BRIEF DESCRIPTION OF THE DRAWINGS

FIG. 14 presents the "on" time for each group of LED dies on the LED emitter in the illumination module of FIG. 9 that generated the light emission patterns shown in FIG. 10;

DETAILED DESCRIPTION

Figure 1:
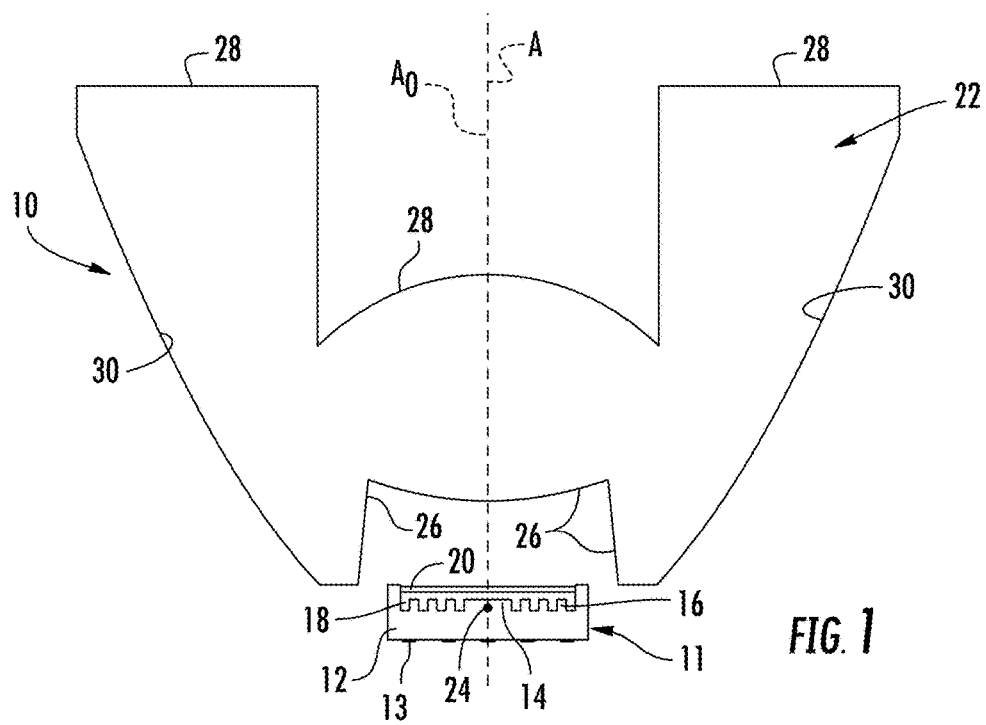
FIG. 1 is a sectional view through one embodiment of an LED illumination module according to aspects of the disclosure.

FIG. 1 is a sectional view through a first embodiment of an LED illumination module 10 incorporating aspects of the disclosure. An LED lamp 11 includes a thermally conductive ceramic substrate 12 configured to support multiple light emitting dies 14, 16. Electrically conductive pads 13 on the bottom of the substrate 12 connect the light emitting dies 12, 14 to electrical circuits on a printed circuit board (not shown). In the embodiment of FIG. 1, a single, relatively large center die 14 is positioned in the center of the ceramic substrate 12. The center die 14 in this embodiment is a square die with 1 mm sides. The center die 14 is surrounded by many small square peripheral dies 16 of about 0.2 mm a side. The shape of each die 14, 16 can be different from the disclosed square and the relative size difference between the center die 14 and the peripheral dies 16 may vary from the disclosed relationship. The dies 14, 16, may be any closed regular or irregular polygon. A YAG phosphor may be employed to convert short (blue, violet) wavelength light radiated from the light emitting dies 14, 16 into amber, red and white light. The YAG phosphor may be dispersed in an epoxy resin 18 or other carrier and fill the area between and above the light emitting dies 14, 16 as shown in FIG. 1. The dies 14, 16 and phosphor/epoxy 18 may be covered by an optically clear silicone encapsulant 20 for protection.

An exemplary internally-reflecting optic 22 is supported above the LED lamp 11 in a position to collect substantially all light generated by the center light emitting die 14 and peripheral light emitting dies 16. The optic 22 is rotationally symmetrical about axis A, has a single focus 24, and is configured to collimate light generated at the focus 24 into a direction parallel with axis A at the center of the optic 22. In FIG. 1, axis A is co-incident with an optical axis $A_O$ of the LED lamp 11, passing through the center of the center die 14 and perpendicular to a plane supporting the LED lamp 11. Optic 22 is one example of a "beam-forming" optical structure, with other non-circular beam-forming optics being compatible with the disclosed illumination module. The peripheral, internal reflecting surface of the TIR optic may be coated with reflective material to reduce leakage of light through this surface.

The term "collimate" is used in this application to mean "make substantially parallel with" a reference line or plane. It will be understood by those skilled in the art that the tolerances of optical elements and the fact that light emitting dies are not true point light sources mean that light emitted from an LED light source through a collimating optic will be substantially collimated, with some light having an emitted trajectory that is not precisely parallel with the reference line or plane. The disclosed optic 22 is a circular optic of the total internal reflecting (TIR) type, which uses a combination of refracting light entry surfaces 26 and light emission surfaces 28, in cooperation with internal reflecting surfaces 30 to alter the trajectory of light radiated from the light emitting dies 14, 16 of the LED lamp 11 (which may also be referred to as an (emitter") into trajectories resulting in pre-determined light emission patterns as described in greater detail below. Alternative optics may employ metalized reflecting surfaces in combination with a lens to re-direct light radiated from the light emitting dies 14, 16 to produce similar light emission patterns.

Generally speaking, a collimating optic reduces the divergence of light radiated from a light emitting die relative to an axis or plane passing through the center of the light emitting die. An optic that collimates light relative to a line (typically referred to as an axis) forms a "spot" light beam form of emission with less than 20° of divergence from the line, and preferably approximately 10° of divergence. The 20° or 10° divergence is measured from one side of the beam to the other, meaning that a 10° beam diverges from the axis A approximately 5° to either side of the axis A. An optic that collimates light relative to a plane reduces the divergence of radiated light relative to a plane, but allows divergence in directions parallel with the plane, resulting in a beam that is visible over a range of vantage points in or near the plane. This emission pattern may be referred to as a "wide-angle" beam and may be described as "partially collimated."

Figure 2:
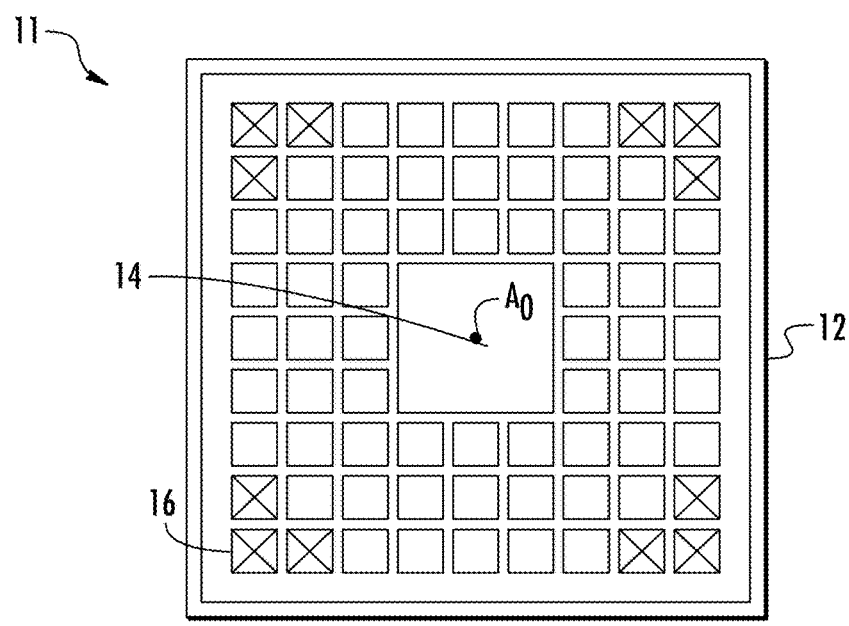
FIG. 2 is a top view of one embodiment of an LED lamp compatible in the LED illumination module of FIG. 1 according to aspects of the disclosure.

In the LED lamp 11 of FIGS. 1 and 2, the center light emitting die 14 is a 1 mm square and has an optical axis $A_O$ passing through the center of the die. The center die 14 is positioned so that the optical axis $A_O$ of the center die 14 passes through the focus 24 of the optic 22. Light is radiated from the center die 14 over a range of radiated trajectories that form a hemisphere of light, which may be referred to as a "lambertian" radiation pattern. The physical size of the center die 14 means that some of the light is emitted from positions spaced apart from the optical axis $A_O$ and focus 24 of the optic 22. Substantially all of the light emitted from the center die 14 passes through a refracting surface 26 of the optic and is accepted into the light transmissive material of the optic 22, which may be constructed of materials such as silicone, polycarbonate, acrylic or glass. Once inside the optic 22, light moves according to well-understood principles such as Snell's law. Light incident upon the internal reflecting surface 30 at the periphery of the optic 22 at angles greater than a critical angle, is reflected into a trajectory according to the direction of the light and its angle of incidence upon the internal reflecting surface 30. In the disclosed embodiment of FIG. 1, the refracting light entry surface 26 and light emission surface 28 at the bottom and top of the optic 22, respectively, cooperate with the internal reflecting surface 30 at the periphery of the optic 22 to alter the radiated trajectory of the light from the center die 14 into an emitted trajectory substantially aligned with the optical axis $A_o$ of the center die 14 (which is coincident with axis A in FIG. 1). Internal reflecting surface 30 may be metalized to reduce leakage of light through this surface.

Figure 1A:
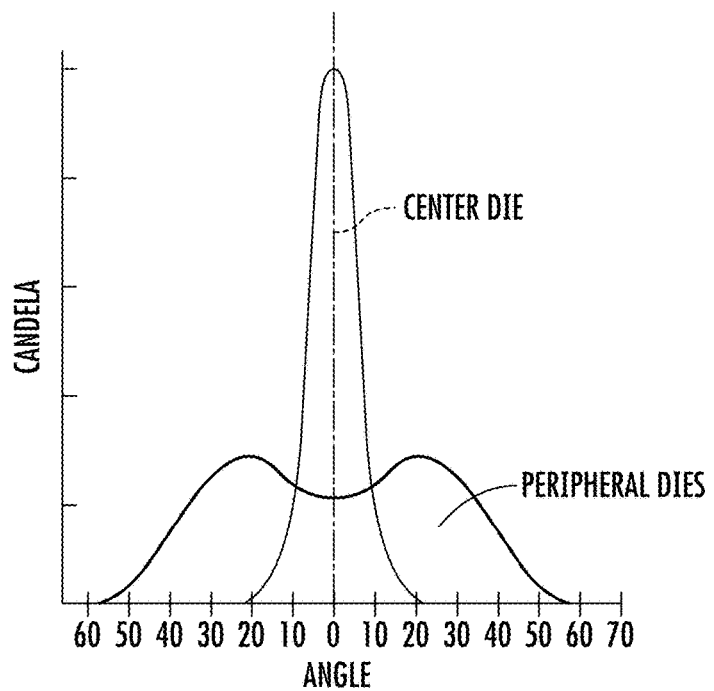
FIG. 1A is a graphical representation of the light emission pattern generated by light emitting dies of the LED illumination module of FIG. 1.

FIG. 1A illustrates the pattern of light emission from the center die 14 and TIR optic 22. The graph shows an emission pattern corresponding to a roughly 10° collimated "spot" beam relative to a center line at 0° coincident with axis A. Alternatively stated, the emission pattern from the center die 14 through a collimating optic 22 results in a beam where substantially all the light is emitted at an angle of 5° or less relative to either side of axis A. The greatest intensity of the beam generated by the center die 14 is at the center of the emission pattern, which resembles a relatively sharp, narrow spike centered on axis A when presented graphically. FIG. 1A also illustrates the emission pattern from the peripheral dies 16 through the collimating optic 22. The peripheral dies 16 generate light that is "off axis" relative to the center axis A of the optic 22. Light generated by the peripheral dies 16 is not collimated by the optic 22, and is emitted in a pattern surrounding the spot beam generated by the center die 14. It will be understood that varying the power to the center die 14 relative to the power delivered to the peripheral dies 16 will produce an emission pattern that varies in its divergence relative to the axis A of the optic 22. When power is applied to both the center die 14 and the peripheral dies 16, light emission from the center die 14 fills the center of the emission pattern from the peripheral dies 16 to provide a wide angle flood emission pattern from the illumination module 10.

The beam-forming optic 22 handles light from the center die 14 very efficiently, meaning that a relatively small amount of luminous flux results in a well-defined spot beam. Because light generated by the center die 14 is handled efficiently and is focused into a small area, the spot beam also has high luminous intensity. The peripheral dies 16 generate light that is handled by the optic 22 relatively inefficiently, meaning that some light is lost in the optic and some light is emitted at trajectories that do not contribute to the intended flood emission pattern. Further, the volume of light emission to be filled by the peripheral dies 16 is much greater than that filled by the center die 14. As a result of these factors, the total luminous capacity of the peripheral dies 16 is greater than the total luminous capacity of the center die 14. Even though each peripheral die 16 may be smaller than the center die 14, the total lumens that can be generated by by the peripheral dies 16 is greater than the center die 14. In addition, the power consumed by the peripheral dies 16 when generating the greater luminous flux is greater than the power consumed by the center die 14.

FIG. 2 is a top view of the LED lamp 11 of FIG. 1, showing the ceramic support 12 for the light emitting dies, including the center die 14 and a large number of much smaller peripheral light emitting dies 16 according to aspects of the disclosure. Although a relatively large center die 14 and smaller peripheral dies are shown, the relative size of the dies 14, 16 is not so limited. In the disclosed LED lamp 11, the center die 14 and peripheral dies 16 are connected so that the center die 14 can be energized separately from the peripheral dies 16. The peripheral dies 16 may be connected to be energized together as a group, or as subsets that can be energized separately. The peripheral dies 16 are laterally spaced from the optical axis $A_o$ of the center die and also from the focus 24 of the optic 22. This means that light radiated from the peripheral dies 16 will be emitted from the optic 22 not as a collimated beam, but as a more divergent beam as shown in FIG. 1A. When graphically presented, the beam formed by the peripheral dies 16 has a much lower intensity along the axis A, with much of the light emitted over a range of angles diverging up to about 45° relative to axis A. The emission pattern from the peripheral dies 16 may be described as a "flood" light emission pattern, but notably lacks intensity along axis A. In the illumination module 10 of FIGS. 1, and 2, the peak intensity of the emission pattern from the peripheral dies 16 is offset from axis A by about 20° as shown in FIG. 1A meaning that the peak intensity of light from the peripheral dies 16 is divergent from axis A by approximately 20 degrees.

The LED illumination module 10 of FIG. 1 is configured so that the center die 14 and peripheral dies 16 may be energized together, or separately. Further, the intensity of light emission from the center die 14 and the peripheral dies 16 can be modulated to produce light emission patterns from a focused spot to a wide angle flood. For example, the center die 14 can be energized at a reduced level as needed to fill the center of a flood emission pattern generated by the peripheral dies 16. Generally, a spot light emission pattern is used to illuminate subjects far away, or to generate warning light signals visible at a great distance as in a light house. A flood light emission pattern may be used to illuminate a construction work area, the scene of a traffic accident or the like. The LED illumination module 10 of FIG. 1 can provide spot, flood or various emission patterns blending the two from a single optic 22 which may have a single focus 24 and using no moving parts.

The arrangement of peripheral dies is not limited to the same shape as the center die. For example, the peripheral dies 16 in FIG. 2 are arranged in a square shape around the square center die 14. Three dies may be removed from the corners of the arrangement of peripheral dies 16, as shown by the "x" through these dies in FIG. 2. Removal of the three peripheral dies 16 at the corners of the support will result in a more rounded light emission pattern from the optic 22. The arrangement of peripheral dies 16 in FIG. 2 is an example of a "ring" of peripheral dies 16 according to the disclosure.

Figure 3:
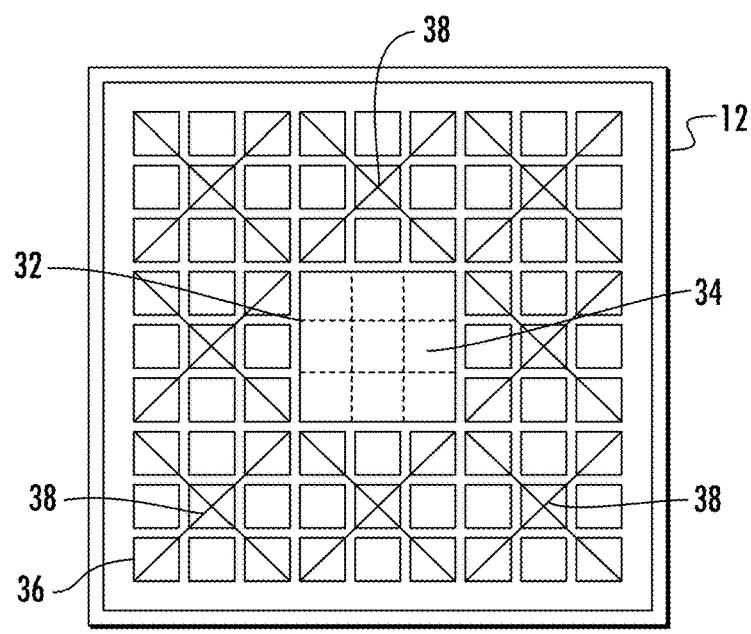
FIG. 3 is an alternative LED lamp compatible with the disclosed LED illumination module according to the disclosure.

FIG. 3 is a top view of a ceramic support 12 illustrating an alternative pattern of light emitting dies, with the "center" light emitting die 32 made up of 9 smaller dies 34. In this embodiment, the group of 9 dies 34 immediately surrounding the center of the support is configured to be energized together as a center group 32, with the peripheral dies 36 surrounding this center group configured to be energized together or in subsets 38. In FIG. 3, crossed lines connect groups of 9 peripheral dies 36 into a subset 38 that is connected to be energized together. Subsets may include equal numbers of dies as shown in FIG. 3, or unequal numbers of dies. The support 12 and light emitting dies 34, 36 will function as described above with respect to the embodiment of FIGS. 1 and 2 and differ only with respect to the construction of the center die as a center group 32 and grouping of peripheral dies 36.

Figure 4A:
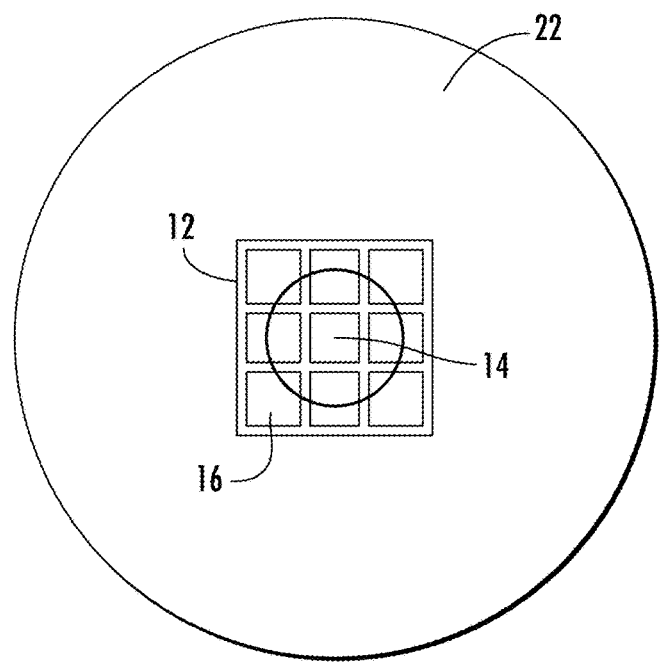
FIG. 4A is a front view pictorial representation of an alternative embodiment of an LED illumination module according to aspects of the disclosure.

FIG. 4A illustrates an alternative grouping of light emitting dies, with 8 peripheral dies 16 surrounding a center die 14. A TIR optic 22 is shown schematically in front of the dies 14, 16. The center die 14 and peripheral dies 16 are configured to be separately energized. In some embodiments, each of the dies 14, 16 could be operated separately and the energy applied to each die may be varied to produce different light emission patterns. Light radiated from each of the peripheral dies 16 is emitted from the optic 22 along trajectories that reinforce the emission pattern diametrically across from the energized peripheral die 16. For example, light from the peripheral die 16 in the upper left corner of the substrate 12 of FIG. 4A contributes to the lower right portion of the flood light emission pattern. Light from the top center peripheral die 16 contributes to a flood light emission at the bottom center of the flood light emission pattern. It will be noted that energizing each of the 8 peripheral dies 16 in a rotating sequence will generate a swirling emission pattern. Energizing the peripheral dies 16 in a left-right or up-down pattern will generate a corresponding oppositely moving light emission pattern from the optic 22.

Figure 4B:
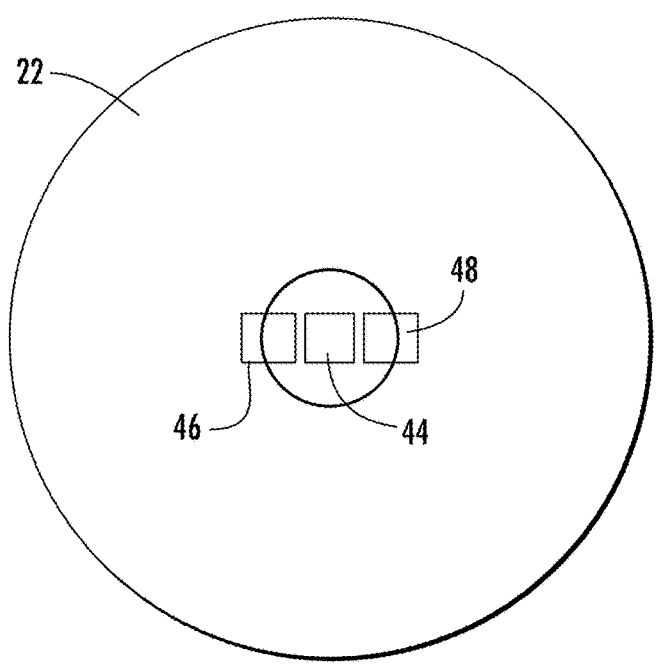
FIG. 4B is a front view pictorial representation of a further alternative embodiment of an LED illumination module according to aspects of the disclosure.

FIG. 4B illustrates three LED lamps 4, 46, 48 closely grouped behind a TIR optic 22. Those skilled in the art will recognize that light emitting dies can be arranged on a common substrate as shown in FIGS. 1, 2 and 3 or on separate substrates as shown in FIG. 4B. When referenced in this disclosure and the appended claims, reference to a "light emitting die" may refer to a die on a common support or a die on a separate support. Each LED lamp 44, 46, 48 includes its own substrate, electrical connections, light emitting die, and primary optic (if present). The optical axis of the center LED lamp 44 is coincident with the rotational axis of the optic 22 and the LED die of the center LED lamp 44 is at the focus of the TIR optic 22, so light radiated from the center LED lamp 44 is focused into a collimated beam, subject to the size of the die and the accuracy of the optic 22 as discussed above. One peripheral LED lamp 46 is positioned to the left and one peripheral LED lamp 48 is positioned to the right of the center LED lamp 44. In this arrangement, light radiated from the left peripheral LED lamp 46 contributes to the right side of the flood light emission pattern, and light radiated from the right peripheral LED lamp 48 contributes to the left side of the flood light emission pattern. Energizing all three of the LED lamps 44, 46, 48 in this embodiment would generate a spot beam flanked by flood emission to the left and right, with relatively little emission above or below a horizontal plane through the three LED lamps 44, 46, 48.

Figure 5:
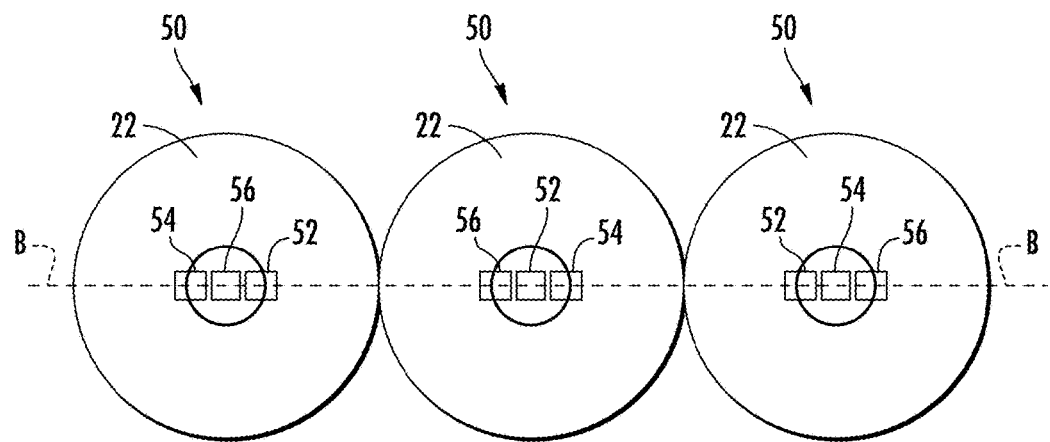
FIG. 5 is a front view schematic representation of a row of LED illumination module s according to aspects of the disclosure.

FIG. 5 illustrates a row of LED illumination modules 50 according to aspects of the disclosure, each LED illumination module 50 having three LED lamps 52, 54, 56 arranged in a row behind a TIR optic 22, similar to that shown in FIG. 4B. The rows of LED lamps 52, 54, 56 are aligned along a common axis B, with groups of three (or more) LED illumination modules 50 mountable together to form a light emitting bar (not shown) useable as a signaling device. In this embodiment, each LED lamp 52, 54, 56 emits a different color (wavelength) of light. By way of example, in each set of three LED lamps, one lamp is amber 52, one lamp is blue 54 and one lamp is red 56. As discussed above, only the center lamp will generate a focused beam aligned with the axis of the optic 22, with the other lamps supplementing a less focused emission diametrically across the emission pattern. In a lighting system designed to generate three colors, putting any one of the colors in the center of all three TIR optics 22 would mean the other two colors are always out of focus and the light emission pattern of the different colors will be unbalanced. In the embodiment of FIG. 5, one die of each color is arranged at the focus of each TIR optic.

In the two TIR optics where a color is not in the center position, the color is once in the left position and once in the right position. This pattern of three colored light emitting lamps (or dies on a common substrate) will generate a balanced emission pattern when each color is energized, with one die in the center position, one die in the right position and one die in the left position.

Figure 6:
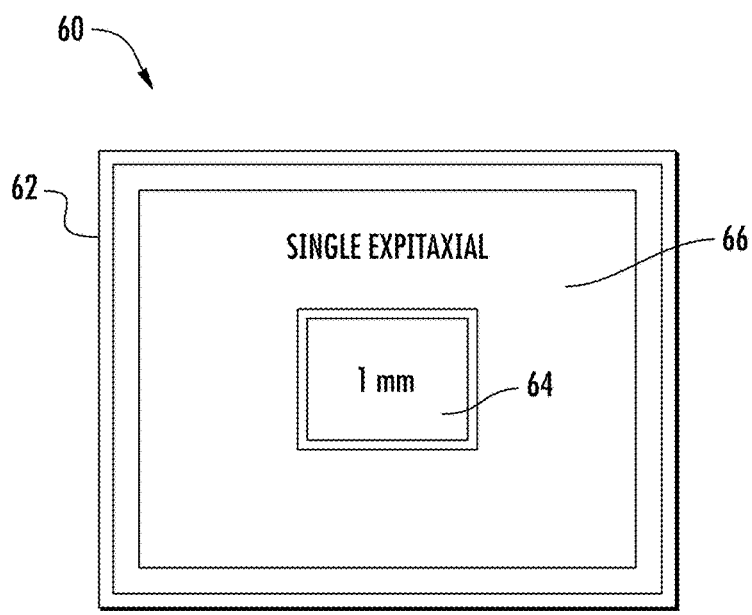
FIG. 6 is a top plan view of an alternative LED lamp compatible with the disclosed LED illumination modules according to aspects of the disclosure.

FIG. 6 illustrates an LED lamp 60 according to aspects of the disclosure. A light emitting die 64 at the center of a support 62 is surrounded by a peripheral die 66 in the form of a single epitaxial light emitting die. In this configuration, the center die 64 and peripheral die 66 are separately controlled. The energy delivered to the center die 64 and peripheral die 66 can be varied to produce light emission patterns from a spot beam to a flood light emission pattern, with the properties of the respective emission patterns dependent upon the optic handling the light. This embodiment can generate spot, flood, combination spot/flood or variations between them without moving parts and through a single optic that may have a single focus. The peripheral die 66 is another example of a "ring" surrounding the center die 64 according to aspects of the disclosure.

Figure 7:
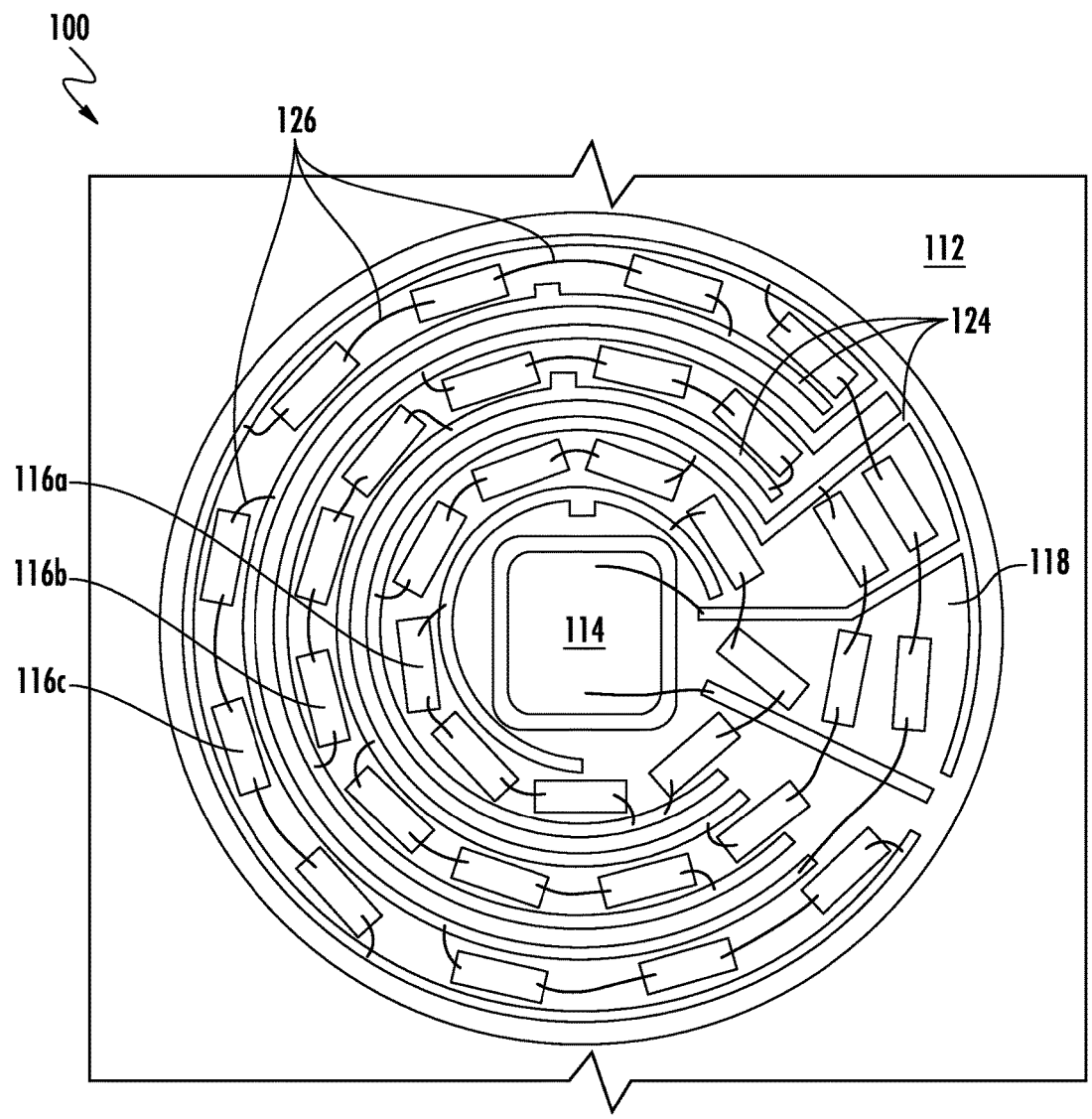
FIG. 7 is a photograph of an exemplary LED emitter according to aspects of the disclosure.
Figure 8:
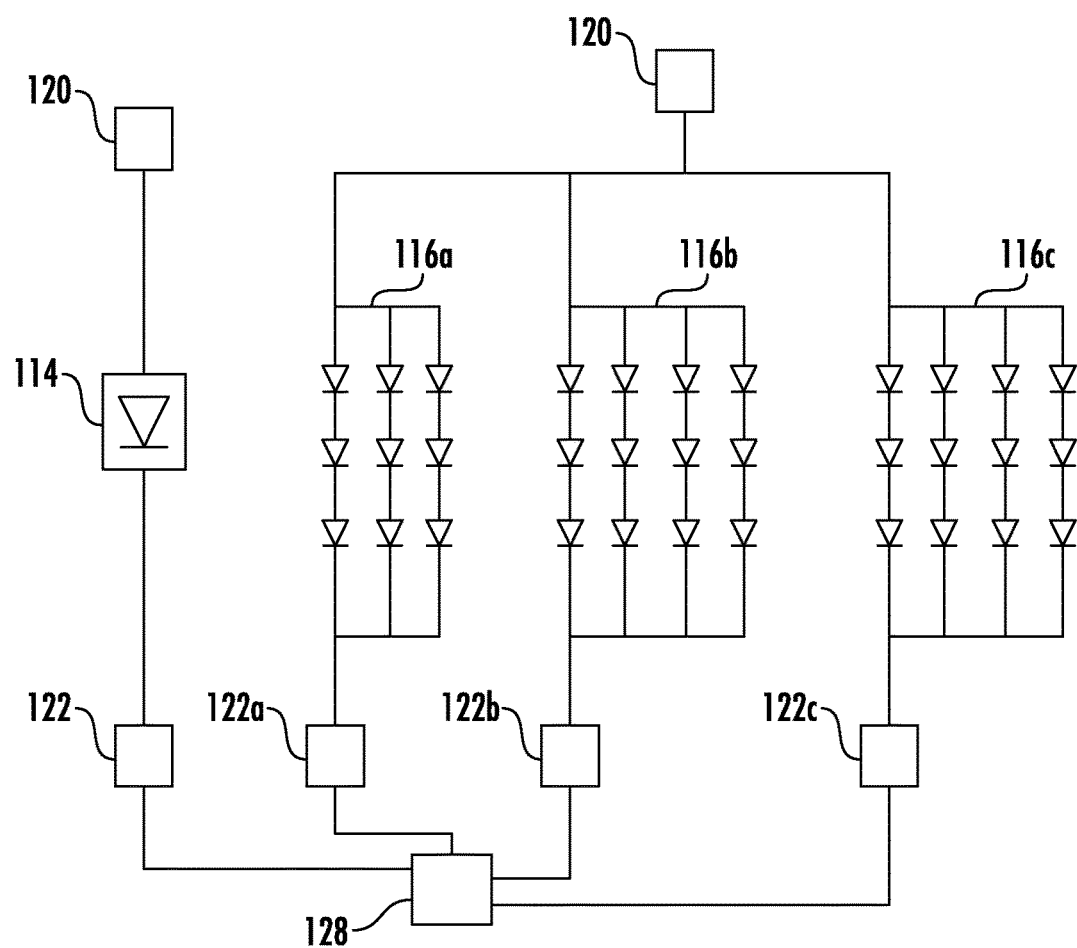
FIG. 8 is an electrical schematic of the LED emitter of FIG. 7.

FIG. 7 is a top view of an exemplary LED emitter 100 according to aspects of the disclosure. An aluminum oxide (Al$_2$O$_3$), substrate 112 supports a plurality of LED dies, with one LED die 114 arranged in the center. The substrate 112 may be constructed of other materials, including alternative ceramic materials. In this embodiment, the peripheral LED dies 116 are arranged in circular rings surrounding the center LED die 114. As schematically represented in FIG. 8, each ring of peripheral LED dies 116a, 116b, 116c are connected to be energized separately from the center die 114 and from each other. The LED dies making up each ring 116a, 116b, 116c are electrically connected to each other so power is applied all the dies in a ring at the same time. As shown in FIG. 8, the center die 114 has its own anode 120 and cathode 122, while the peripheral dies 116 share a common anode 120, with each ring of peripheral dies 116a, 116b, 116c having a separate cathode 122a, 112b, 122c, respectively. Controller 128 is connected to the cathode 122, 122a, 112b, 122c of each string of LED dies 114, 116 to control power selectively applied to each string as described. The exemplary emitter 100 of FIG. 7 has 9 peripheral dies 116a in the inner ring, and 12 peripheral dies 116b, 116c in each of the middle and outer rings, respectively. The number, shape and geometrical arrangement of peripheral dies 116 may vary from this example.

Further, the width of each of the inner, middle and outer rings can each be designed to enable the placement of more or less peripheral dies 116a, 166b, 116c, or peripheral dies 116 each capable of generating a luminous flux selected to provide a desired combined maximum luminous flux for each ring (or group) of peripheral dies 116. The substrate 112 is configured to dissipate the heat generated by the peripheral dies 116. FIG. 7 illustrates an emitter 100 in which the radial spacing and radial dimension of the dies 116 in each ring are approximately equal. The dies 116 are illustrated as rectangular, with a narrow dimension of the rectangle perpendicular to a radius of the emitter 100. However, each of the outer rings could be designed with a wider radial dimension to allow for a greater number of peripheral dies 116c, or dies of a larger size, or arrangement of dies in a radial orientation, rather than the illustrated circumferential orientation. Alternatively, the dies 116 in the peripheral rings may have greater power applied, resulting in greater luminous flux to fill the periphery of a flood light emission pattern.

In the emitter of FIG. 7, the LED dies 114, 116, are configured as a closed regular polygon and use an InGaN semiconductor, emitting light in the blue part of the spectrum, combined with a yttrium aluminum garnet (YAG) phosphor (doped with cerium). Most of the LED's blue photons are absorbed by the phosphor and re-emitted in the yellow part of the spectrum. The mix of the residual blue photons and yellow illumination provides a good approximation of white light to the eye. The phosphor is dispersed in an epoxy layer 118 that covers and protects the LED dies 114, 116. This configuration means that light from each die is combined with light from other adjacent dies to produce a "patch" of light. In the disclosed emitter 100, this configuration results in an area of light emission that expands as each ring of dies are energized. Other die materials and/or other phosphor materials may be selected to generate colors other than white. It is also possible to select different die materials and different phosphor materials to create a light that changes color and beam shape at the same time with no moving parts.

Each LED die 114, 116 must be forward biased by application of a voltage, which varies depending upon the type of LED. Connecting several LED dies in series allows the series-connected LED dies to be turned on and off at the same time, but also requires application of a voltage to the series string of LED dies sufficient to forward bias each of the dies. The voltage required is the sum of the forward bias voltage of all the LED dies connected in series. The voltage necessary to turn on an individual LED die may be 3.5V, so ten of these LED dies in series will require a voltage source exceeding 35V. The electrical systems in motor vehicles are typically 12 VDC or 24 VDC systems. When the voltage necessary to turn on a string of LED dies exceeds the voltage available, it is necessary to employ a switched-mode power supply that can convert the available 12 VDC or 24 VDC to the required voltage. Alternatively, the LED dies can be connected in short series strings where the sum of the forward voltages of the LED dies in the string does not exceed the available voltage. FIG. 8 shows the peripheral dies 116a, 116b, 116c arranged with three dies in series, and the series strings connected in parallel. In the case of LED dies requiring a forward voltage of 3.5V, three LED dies connected in series can be operated in a 12 VDC automotive electrical system without a switched-mode power supply. It may be preferable to use a switched-mode supply for the center die, to efficiently match the relatively low forward bias voltage to the available 12 or 24 VDC in a vehicle.

FIG. 7 further illustrates conductors 124 embedded in the epoxy and connected to anode and cathode electrical connections. Wire bonds 126 connect each peripheral die 116 to another die in series, with each series of dies 116 connected at one end to an anode and at the other end to a cathode electrode as shown in FIG. 8. The conductors 124 and wire bonds 126 may be metallic conductors such as wires, or may be constructed of conductive materials (not shown) deposited on the substrate 112. Conductive materials may be deposited on the substrate by physical vapor deposition, or other techniques known in the art.

Figure 9:
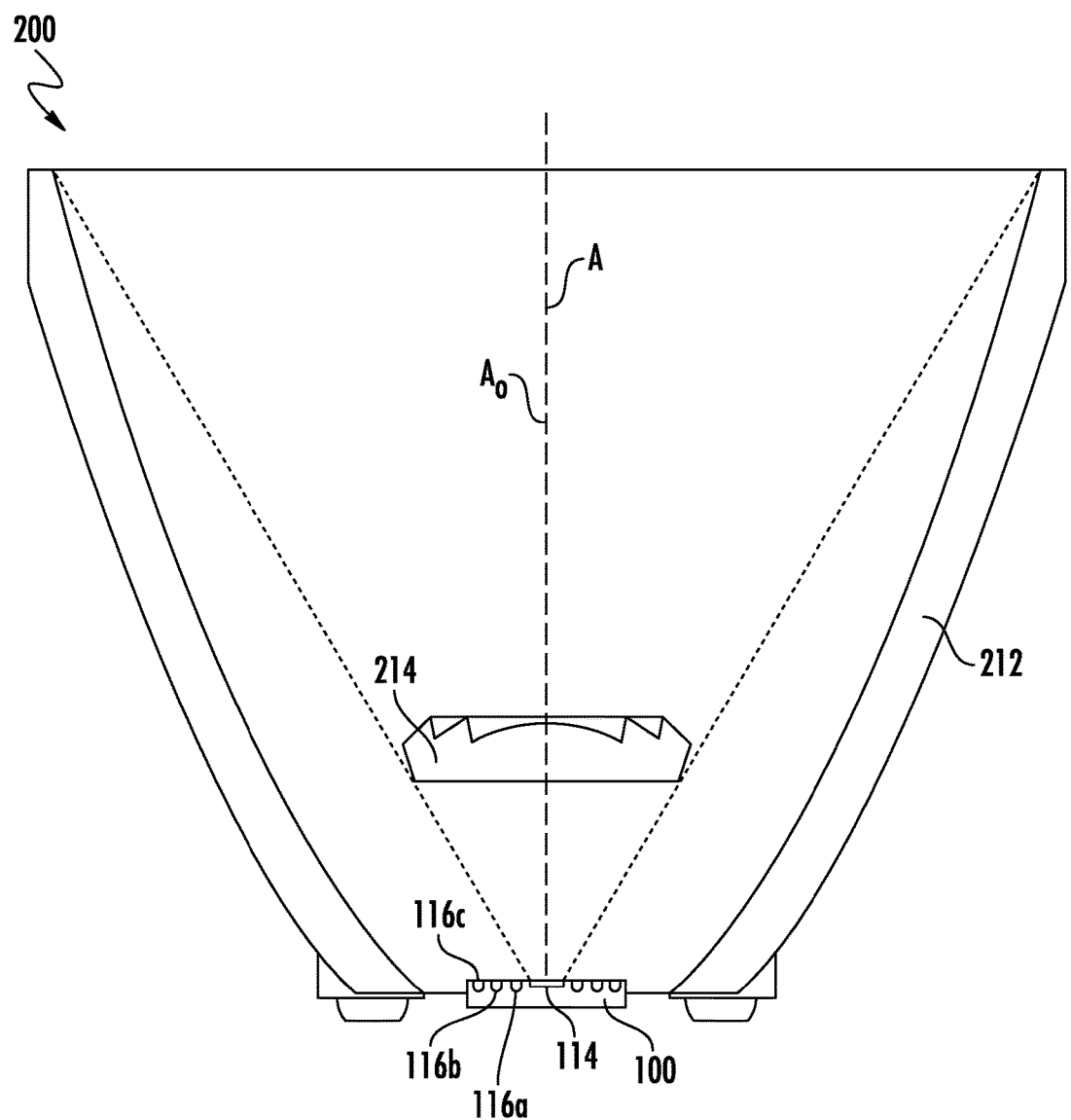
FIG. 9 is a sectional view through an embodiment of an illumination module incorporating the LED emitter of FIGS. 7 and 8.

FIG. 9 is a sectional view through an alternative embodiment of an illumination module 200, incorporating the emitter 100 of FIGS. 7 and 8. Light radiated from the emitter 100 is re-directed by a reflector 212 and a lens 214. In this disclosed embodiment, the reflector 212 and lens 214 are rotationally symmetrical about an axis A that is coincident with an optical axis A$_O$ centered on the center die 114 of the emitter 100. The reflector 212 and lens 214 are configured to substantially collimate light emitted from the center die 214 into a beam. Light is radiated from the center die 114 of the emitter 100 over a range of trajectories, some of which are incident upon the reflector 212 (wide angle light) and some of which are incident upon the lens 214 (narrow angle light). The lens 214 has a diameter and is positioned within the reflector so that a majority of light radiated from the center die 114 emitter 100 either passes through the lens 214 or is re-directed by the reflector 212. The illumination module 200 of FIG. 9 happens to be configured to produce a spot beam emission pattern from light generated by the center die 114 of emitter 100. The spot beam may have a divergence of between 5° and 15°, depending upon the intended use for the module 200. The optical system of reflector 212 and lens 214 is configured to re-direct light radiated from the center die 114 at large angles relative to the optical axis of the center die into reflected or refracted trajectories at a much smaller angle relative to the optical axis $A_O$. In this disclosure, this emission pattern is referred to as a "collimated beam," but the degree of collimation is selected according to the preference of the engineer to be suitable for a particular purpose. In most cases the radiation pattern of the center die 114 is "shaped" by reducing the divergence of light from the center die relative to axis A.

As previously described, light emitted from the peripheral dies 116a, 116b, 116c is radially offset from the optical axis $A_O$ of the center die, with each ring having a progressively greater radial offset. The position at which light is radiated from the emitter 100 determines the path of light through the reflector 212 and/or lens 214. Generally speaking, the further from the optical axis $A_O$ light is radiated from the emitter 100, the greater the angle of divergence from the optical axis $A_O$ will be after passing through the reflector 212 and/or lens 214. Energizing the rings of LED dies in a sequence from the center-out creates a progressively broader "flood" light emission pattern from the module 200.

Figure 10:
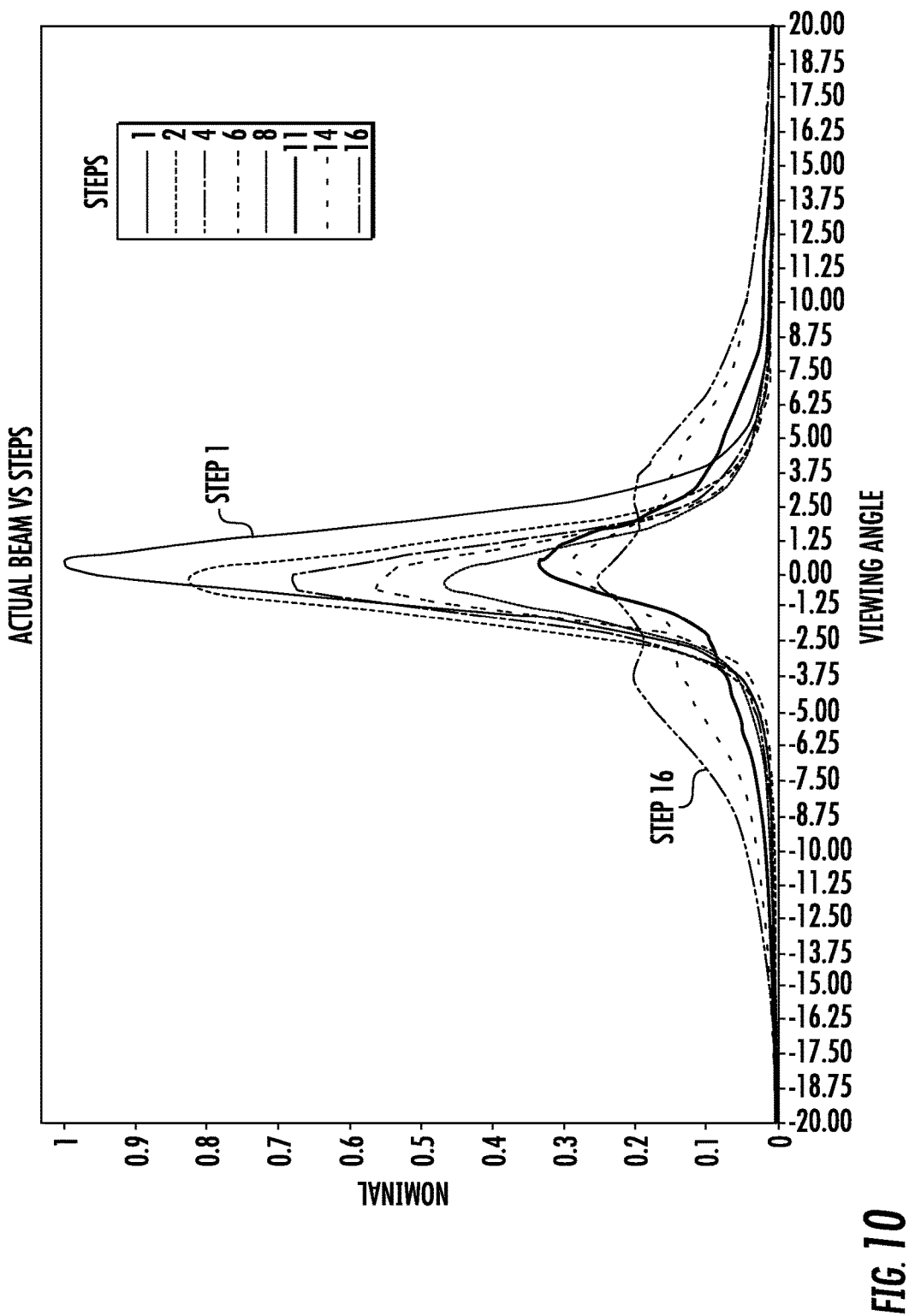
FIG. 10 is a graphical representation of light emission from the illumination module of FIG. 9, showing the emission pattern generated by different patterns of power applied to groups of dies on the emitter.
Figure 11:
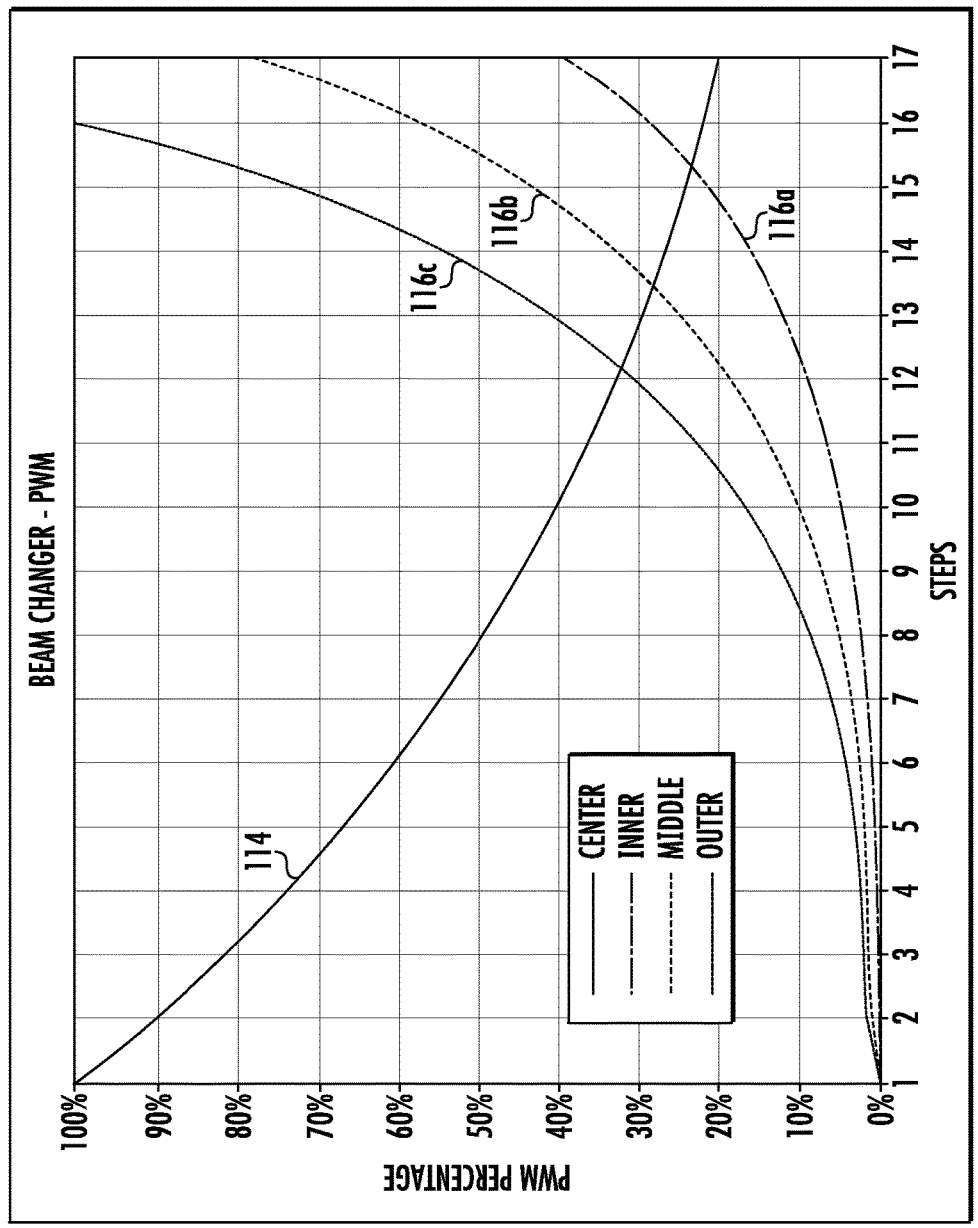
FIG. 11 is a graphical presentation of the PWM percentages shown in FIG. 14, generally corresponding to the variation of power delivered to the groups of LED dies on the LED emitter in the illumination module of FIG. 9.

FIG. 10 is a graphical presentation of light emitted from module 200 by different patterns of power applied to the center die 114 and rings of peripheral dies 116a, 116b, 116c according to the pattern shown in FIG. 14 and FIG. 11. Each of the center die 114 and rings of peripheral dies 116a, 116b, 116c can be energized individually, and the amount of effective power applied to each group of LED dies can be controlled by pulse width modulation (PWM) as is known in the art. FIG. 14 and FIG. 11 show one representative example of a pattern of power delivery that generates a variable divergence light emission pattern from module 200. FIG. 10 is a graphical presentation of a light beam emitted from module 200 when electrical energy is applied to the LED dies according to the pattern of FIG. 14 and FIG. 11. The pattern of light emission clearly progresses from a tightly collimated beam with a divergence of less than 5° to either side of the center axis A to a flood emission pattern diverging from the central axis by an angle of about 7.5°. The change in beam shape from less divergent (spot) to more divergent (flood) is produced by varying the power delivered to the four groups of LED dies. It will be noted that the change in power applied to the groups of LEDs is not linear. The shape and position of the dies 114, 116 and the large area of emission pattern filled by light from the peripheral dies 116 mean that light emitted from the peripheral dies 116 appears much less intense compared to the light emitted from the center die 114, so power to the center die 114 is reduced more quickly than power is increased to the rings of peripheral dies 116a, 116b, 116c, as shown in FIG. 11 and FIG. 14.

Each of the rings of dies arranged around the center die generates luminous flux in proportion to the current delivered to the dies. Each ring has a maximum luminous flux determined by the flux generated by each die when driven at a maximum sustainable current. The maximum sustainable current is limited by the capacity of the conductors connecting the dies, and the thermal capacity of the emitter substrate to remove heat from the dies. The emitter can be constructed so that the luminous capacity of each ring increases as the rings progress away from the optical axis (passing through the center of the center die). The relationship of luminous capacity between the rings may be non-linear, such as exponential or logarithmic. The outer ring may be far brighter than the inner ring, to generate the luminous flux necessary to fill the large peripheral region of the flood illumination pattern. When the rings are configured with luminous capacity that increases in a non-linear manner from inner ring to outer ring, the power applied to each ring may be increased within the power handling range of the dies in each ring. Balancing power applied to the rings of dies during transition from the spot illumination pattern to the flood illumination pattern generates a pattern of illumination with a clearly-defined peak brightness along the optical axis of the illumination module. As shown in FIG. 10, the illumination curve for each of the first 11 steps of the transition from spot to flood has a single, well-defined peak along the optical axis, and no secondary off axis peaks. Maintaining this basic beam profile for most of the transition from spot to flood provides an illumination pattern without bright spots that may interfere with visual processing of the scene.

In the emitter of FIG. 7, the inner and middle rings of LEDs are never driven at full power. This means that these rings are configured with luminous capacity that is never used. In another exemplary embodiment, it may be more efficient to configure the outer ring to provide the luminous flux required to fill the peripheral region of the flood beam at a desired intensity, then configure each of the rings between the center die and the outer ring to provide the luminous flux necessary to fill the beam profile when each ring is driven at or close to its power handling capacity.

Figure 12:
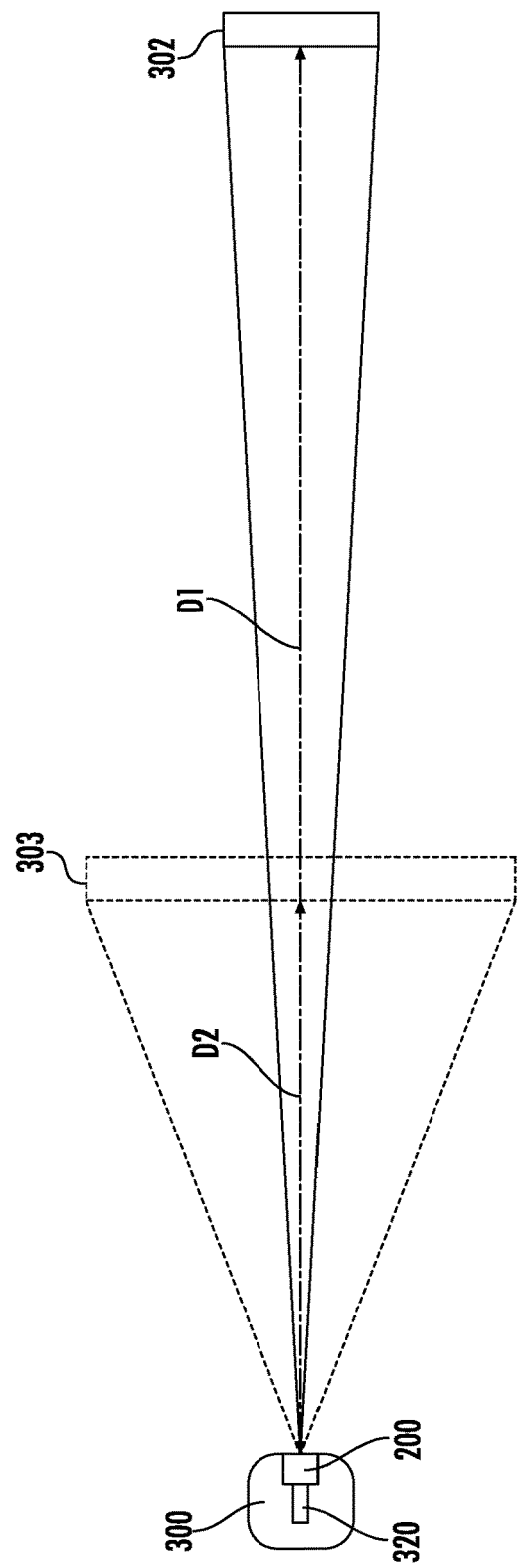
FIG. 12 pictorially represents an illumination module with range finding capability where the beam shape is adjusted depending upon a distance from the illumination module to a representative target.

A spot beam is generally more useful for long range illumination or brightly lighting a small area for detailed work at close quarters. A flood light emission pattern is generally more useful for illuminating large areas or wide angle viewing at short distances. FIG. 12 illustrates a light source 300 incorporating an illumination module 200 according to aspects of the present disclosure. A target 302 at a first distance D1 from the light source 300 can be fully illuminated with a focused beam. A second target 303 at a distance D2 closer to the light source 300 would only be partially illuminated by that same beam shape. The second target 303 can be fully illuminated by a beam having a greater angle of divergence. One example of such a target could be a suspect at a crime scene. It would be useful for law enforcement personnel to be able to see the person's arms and hands to determine the type of threat presented by that individual. The focused beam may not illuminate the whole person, and so the arms and hands may not be visible. Changing the shape of the beam would allow law enforcement personnel to accurately assess the situation. Beam shape can be altered using a manual input, such as a dial or slide. A control circuit can be configured to adjust power applied to the LED dies according to user manipulation at the input. This kind of illuminator could be used on police and search vehicles to provide variable spot illumination, and take down or alley lights with variable beam shape to improve visibility of targets or scenes at different distances from the vehicle.

In one alternative embodiment, the light source 300 of FIG. 12 could be equipped with a range finder 320 to determine the distance to the target and adjust the beam shape according to the distance. The range finder can be a laser range finder or other non-contact distance measurement method known in the art, such as an ultrasonic range finder. Controlling beam shape according to distance may have many applications, including for a flash light or other portable illuminator that varies beam width by distance from an object. One example is lighting for construction zone warning, where a focused beam visible over long distance could be used to alert traffic at a distance, but the beam would gradually become less focused as vehicles approach, so as not to blind the motorist and provide better illumination of the scene. Targeting systems for weapons or cameras are another possible application, where the beam is configured to illuminate the target according to the distance from the illumination module. Range finding can be used to continuously vary the beam shape as the target moves relative to the weapon or imaging system.

Figure 13:
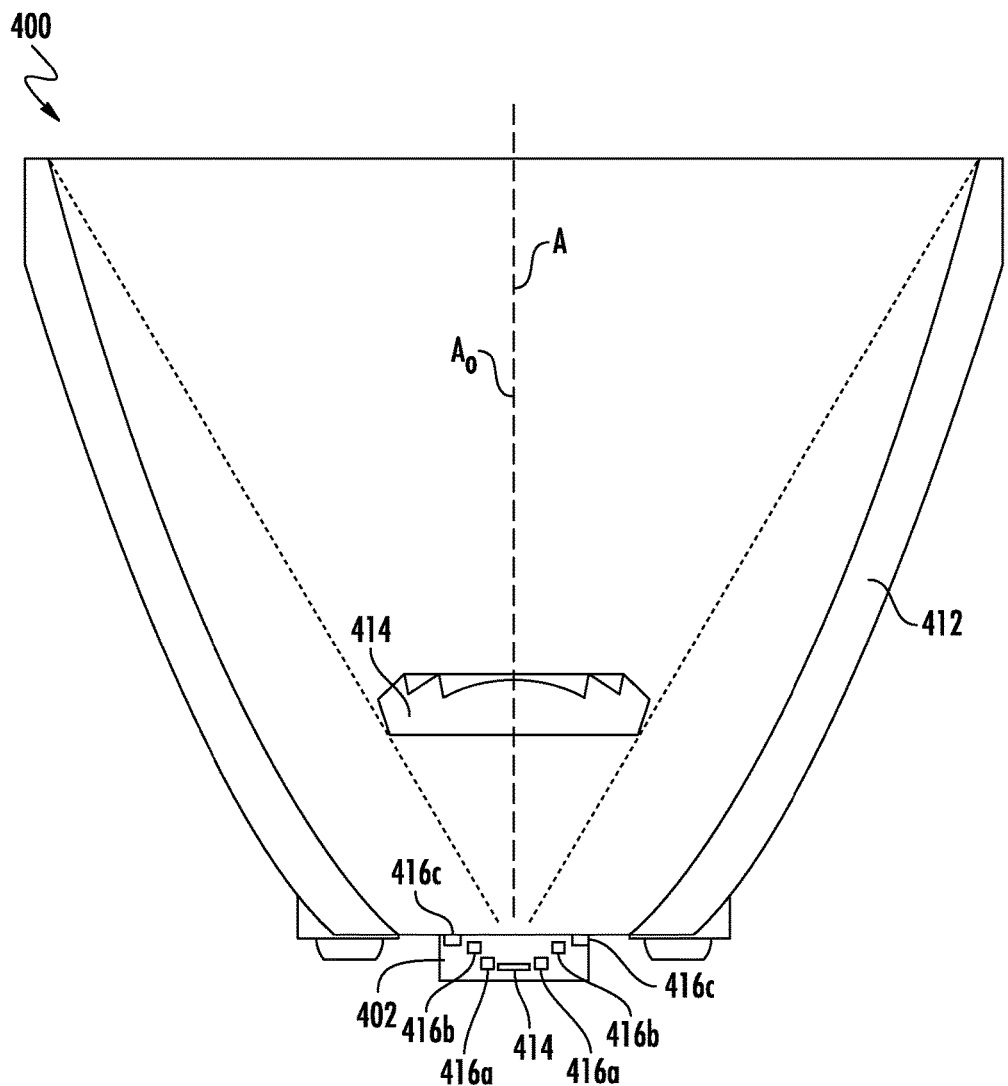
FIG. 13 is a sectional view through an alternative embodiment of an LED illumination module according to aspects of the disclosure.

FIG. 13 is a sectional view through an alternative embodiment of an illumination module 400, incorporating an emitter 402. Light radiated from the emitter 402 is re-directed by a reflector 412 and a lens 414. In this disclosed embodiment, the reflector 412 and lens 414 are rotationally symmetrical about an axis A that is coincident with an optical axis $A_O$ centered on the center die 414 of the emitter 402. The reflector 412 and lens 414 are configured to substantially collimate light emitted from the center die 414 into a beam. Light is radiated from the center die 414 of the emitter 402 over a range of trajectories, some of which are incident upon the reflector 412 (wide angle light) and some of which are incident upon the lens 414 (narrow angle light). The lens 414 has a diameter and is positioned within the reflector so that a majority of light radiated from the center die 414 emitter 402 either passes through the lens 414 or is re-directed by the reflector 412. The illumination module 400 of FIG. 13 happens to be configured to produce a spot beam emission pattern from light generated by the center die 414 of emitter 402. The spot beam may have a divergence of between 5° and 15°, depending upon the intended use for the module 400. The optical system of reflector 412 and lens 414 is configured to re-direct light radiated from the center die 414 at large angles relative to the optical axis of the center die into reflected or refracted trajectories at a much smaller angle relative to the optical axis $A_O$. In most cases the radiation pattern of the center die 414 is "shaped" by reducing the divergence of light from the center die relative to axis A.

As previously described, light emitted from the peripheral dies 416a, 416b, 416c is radially offset from the optical axis $A_O$ of the center die and with each ring having an elevated position with respect to center die 414 and respective interior rings. The position at which light is radiated from the emitter 402 determines the path of light through the reflector 412 and/or lens 414. Generally speaking, the further from the optical axis $A_O$ light is radiated from the emitter 402, the greater the angle of divergence from the optical axis $A_O$ will be after passing through the reflector 412 and/or lens 414. Also, the elevated position of each ring puts the corresponding peripheral dies 416a, 416b, 416c closer to the reflector 412 which allows these dies to project light further away from the optical axis $A_O$. The respective elevated position of peripheral dies 416a, 416b, 416c further allows for a wider flood emission pattern while advantageously not increasing the required diameter of the emitter 402. An additional advantage of the elevated position of peripheral dies 416a, 416b, 416c also provides a greater opportunity for enhanced heat removal in the substrate of the emitter 402. The area of the emitter 402 below the peripheral dies 416a, 416b, 416c, and center die 414 can be filled with highly thermally conductive material, or give a convoluted surface area (not shown) to shed heat in an arrangement where there is a cooling fluid (air or liquid) circulated at the convoluted surface of emitter 402. Energizing the rings of LED dies in a sequence from the center-out creates a progressively broader "flood" light emission pattern from the module 400.

The disclosed illumination modules may be configured to produce light that is not visible to the human eye, such as infra-red (IR) light. A beam of IR light having a variable shape may be useful in night vision equipment for the same reasons as visible light for use in search lights and other forms of illumination for use at night and in combination with night vision equipment.

Automotive headlight systems typically employ at least two illuminators, one for a high beam for distance visibility and another for low beam when driving against opposing traffic. It may be possible to employ illumination modules according to the present disclosure so one illuminator could alter the beam shape to produce both the high beam and low beam emission pattern.

Aircraft typically employ landing lights that generate a long distance, collimated beam and also a taxi light with a broad flood pattern. It may be possible to employ illumination modules according to the present disclosure to create a single aviation light that can serve both landing and taxi functions, thereby eliminating the weight and expense of separate lights. The combined landing and taxi light may include a speed sensor, making the taxi beam shape available only when the speed of the aircraft indicates the aircraft is on the ground.

LED based grow lights may also benefit from automated change in emission pattern. A beam focused on a seedling can be controlled to expand to encompass the span of the growing plant. The beam shape can be altered according to a measured distance to the top of the plant, or according to an elapsed period of hours or day/night cycles. It may also be possible to alter the wavelength of light emitted from the grow light in concert with the beam shape by providing peripheral dies and/or die phosphor combinations that emit different wavelengths of light than the center die. Changing wavelength or color of light in a grow light could be employed to simulate change of seasons or to tune the grow light's color to the needs of a plant at different stages of its growth or maturation cycle.

According to aspects of the disclosure, the shape of a beam from the disclosed illuminator could be varied depending upon variables including but not limited to speed, altitude, distance, GPS position, input from vehicle systems, or angular orientation of the illuminator. One example would be a headlamp that changes beam shape from flood when the angular position indicates the wearer is looking down at the ground in front of them, to a beam when the wearer looks up and needs to see into the distance. Systems may be equipped to measure light reflected from a target lit by the disclosed illumination module. Reflected light could be employed to alter the shape of the beam until reflected light is maximized, indicating that the beam shape is matched to the size and distance of the target. Accelerometers, GPS sensors, altimeters, and other instrumentation can be used to provide control inputs for altering the shape of the beam.

The disclosed illuminators can be controlled to produce a continuously or intermittently variable emission pattern alternating between spot and flood. Such a variable pattern may be used as an attention grabbing warning light signal or may be used to disorient or temporarily blind individuals or groups of humans or animals. Particular variable beam patterns may be useful on aircraft to avoid bird strikes.

Control over beam shape may be accomplished by manual inputs, automated control or remote/wireless signals over a network or local wireless signal such as blue tooth or WiFi. An illumination module according to the present disclosure may be controlled by an application program (app) installed on a cell phone, tablet or other device equipped to communicate with the illumination module. The illumination module can be equipped with a blue tooth transceiver, for example, and communicate via blue tooth with a phone or tablet.

What is claimed:

1. An LED light assembly emitting a variable light emission pattern with no moving parts, comprising:
    a beam-forming optic having a focus;
    a plurality of light emitting dies including a center die having an optical axis $A_O$ passing through said focus so that light from said center die is emitted from said optic as a collimated beam, and a plurality of peripheral dies surrounding said center die, each said peripheral die having an optical axis offset from optical axis $A_O$ so that light from said peripheral dies is emitted from said optic in a divergent emission pattern radially outward of said collimated beam;
    a controller operatively connected to said center die and said peripheral dies to vary power delivered to said center die and said peripheral dies, said controller configured to independently vary the power applied to said center die and said peripheral dies from 0% to 100% of a maximum sustainable power,
    wherein in a first mode of operation, said controller applies 100% of said maximum sustainable power to said center die to generate said collimated beam, and in a second mode of operation, said controller reduces power applied to said center die and increases power applied to said peripheral dies to generate a divergent beam, the power applied to said center die in said second mode being at least 10% of said maximum sustainable power.

2. The LED light assembly of claim 1, wherein in said first mode of operation said controller applies 0% of said maximum sustainable power to said peripheral dies, and power applied to said center die in said second mode never falls below at least 10% of said maximum sustainable power.

3. The LED light assembly of claim 1, wherein said controller is configured to transition from said first mode to said second mode in a plurality of steps, each step reducing power applied to said center die at a first variable rate of change that decreases from the first mode to the second mode, and increasing power applied to said peripheral dies at a second variable rate of change that increases from said first mode to said second mode.

4. The LED light assembly of claim 1, wherein said controller is configured to alternate between said first mode and said second mode in a continuous or intermittent pattern to generate a light emission pattern that alternates between a focused beam and a divergent beam.

5. The LED light assembly of claim 1, wherein said controller varies power delivered to the center light emitting die and the plurality of peripheral dies according to an input.

6. The LED light assembly of claim 5, wherein the input is selected from the group consisting of an angular position of the light assembly, a distance of the light assembly to a target illuminated by said light assembly, a speed of a vehicle to which the light assembly is attached, an altitude of an aircraft to which the light assembly is attached, and a GPS location of the light assembly.

7. The LED light assembly of claim 1, wherein said peripheral dies are arranged in at least one ring centered on said focus.

8. The LED light assembly of claim 1, wherein said center die generates a first maximum luminous flux when driven at said maximum sustainable power and said peripheral dies generate a second maximum luminous flux when driven at said maximum sustainable power, said second maximum luminous flux being greater than said first maximum luminous flux.

9. The LED light assembly of claim 1, wherein said plurality of light emitting dies are arranged on a common support.

10. An LED light assembly emitting a variable light emission pattern with no moving parts, comprising:
    a beam-forming optic having a focus in a first plane;
    a plurality of light emitting dies arranged on a support to emit light into said beam forming optic, said plurality of light emitting dies including a plurality of peripheral dies in said first plane, said plurality of peripheral dies having optical axes radially offset from said focus;
    a controller operatively connected to apply power independently to each of said peripheral dies, application of power to a peripheral die resulting in light emission from said optic at a position diametrically across from a position of said peripheral die on said substrate, said controller configured to apply power to selected peripheral dies to generate a moving light emission pattern from said optic.

11. The LED light assembly of claim 10, wherein said plurality of peripheral dies surround said focus and said controller is configured to apply power to said peripheral dies in a rotating sequence to produce a swirling light emission pattern.

12. The LED light assembly of claim 10, wherein said plurality of peripheral dies surround said focus and said controller is configured to apply power to said peripheral dies in a non-linear pattern across said substrate.

13. The LED light assembly of claim 10, wherein each of said peripheral dies comprise a plurality of light emitting dies to which power is applied at the same time.

14. An LED light assembly emitting a variable light emission pattern with no moving parts, comprising:
    a beam-forming optic having a focus;
    a plurality of light emitting dies including a center die having an optical axis $A_O$ passing through said focus so that light from said center die is emitted from said optic as a collimated beam, and a plurality of peripheral dies surrounding said center die, each said peripheral die having an optical axis offset from optical axis $A_O$ so that light from said peripheral dies is emitted from said optic in a divergent emission pattern radially outward of said collimated beam;
    a controller operatively connected to said center die and said peripheral dies to vary power delivered to said center die independently of power delivered to said peripheral dies,
    wherein power is applied to said center die and said peripheral dies in a continuous or intermittent pattern alternating between said center die and said peripheral dies to generate a light emission pattern which varies between a collimated beam and divergent beam.

15. The LED light assembly of claim 14, wherein said center die emits light of a first color different from a color of light emitted from the plurality of peripheral dies.

16. The LED light assembly of claim 14, wherein said plurality of peripheral dies are arranged in at least a first group and a second group and said controller is configured to vary power applied to said first group independently of power applied to said second group.

17. The LED light assembly of claim 14, wherein said peripheral dies are arranged in at least one ring centered on said focus.

* * * * *